United States Patent [19]

Wolff

[11] 4,328,831
[45] May 11, 1982

[54] ROTARY VALVE

[76] Inventor: Robert C. Wolff, 955 Crystal St., New Orleans, La. 70124

[21] Appl. No.: 156,918

[22] Filed: Jun. 6, 1980

Related U.S. Application Data

[60] Continuation-in-part of Ser. No. 469,807, May 14, 1974, abandoned, which is a division of Ser. No. 411,848, Nov. 1, 1973, Pat. No. 3,883,269.

[51] Int. Cl.³ ........................ F16K 3/08; F16K 31/122
[52] U.S. Cl. ................................ 137/625.31; 251/208; 251/59
[58] Field of Search ........................ 137/625.31, 625.3; 251/59, 208

[56] References Cited

U.S. PATENT DOCUMENTS

| | | | |
|---|---|---|---|
| 621,864 | 3/1899 | Smith | 251/208 |
| 1,187,987 | 6/1916 | Gregory | 137/625.31 |
| 1,260,571 | 3/1918 | Peck | 137/625.31 X |
| 1,856,825 | 5/1932 | Alphonso | 137/625.3 |
| 2,241,537 | 5/1941 | Buboltz | 137/625.3 |
| 2,935,293 | 5/1960 | Monson | 137/625.31 X |
| 3,110,228 | 11/1963 | Shramo et al. | 251/59 X |
| 3,752,041 | 8/1973 | Smith | 251/59 X |

Primary Examiner—Arnold Rosenthal
Attorney, Agent, or Firm—Charles C. Garvey, Jr.

[57] ABSTRACT

A rotary valve apparatus having particular utility to the valving of high solids content fluids such as slurries and the like provides a normally fixed, generally flat circular disk defining a valve body and providing a plurality of radially spaced flow openings and an open center. A generally flat valving member is mounted in face-to-face engagement with the disk and is movable with respect to the disk between open and closed positions. The valving member provides a hub with a shaft opening therethrough and a plurality of radially projecting valving members which align with and cover the flow openings in the closed position. A common shaft penetrates the open center and the shaft opening and affixes at one thereof to the valving member for rotation therewith. The common shaft is generally coincident with the central axis of the valve body and is entirely disposed within the fluid flow stream being valved. A pneumatically operative vane affixed to the common shaft at the opposite end portion thereof from the valving member moves with the shaft through equi-angular rotation. A vane housing is mounted rigidly by brackets, for example, on the circular disk body and about the vane with the housing providing stops defining the extent of angular movement of the vane. Movement of the vane between the stops correspondingly moves the valving member between open flow and closed flow positions.

11 Claims, 10 Drawing Figures

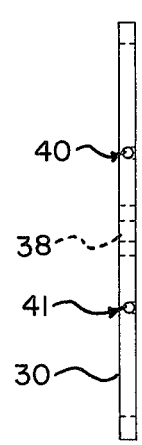
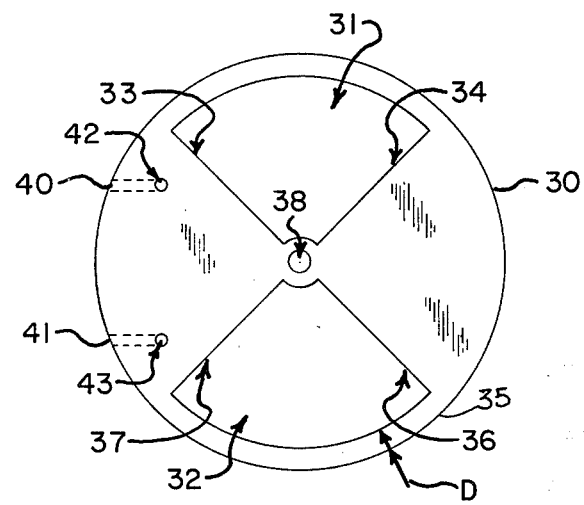
FIG. 5  FIG. 5A
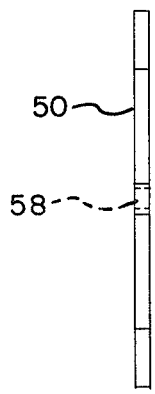
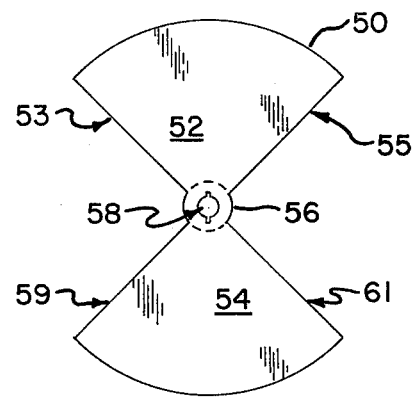
FIG. 6  FIG. 6A
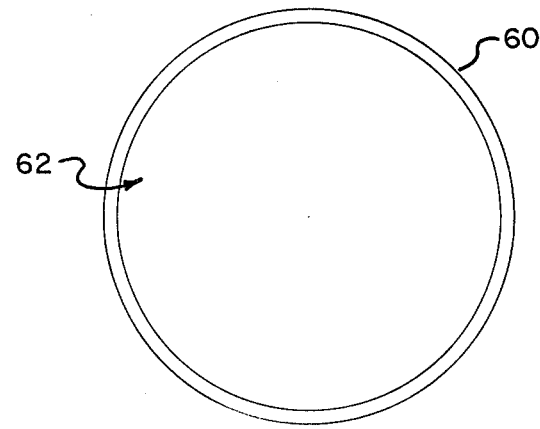
FIG. 7  FIG. 7A

ROTARY VALVE

Reference to Related Application as follows:

This is a continuation-in-part of U.S. application Ser. No. 469,807 filed May 14, 1974, which is a division of U.S. application Ser. No. 411,848, filed Nov. 1, 1973, now issued U.S. Pat. No. 3,883,269.

BACKGROUND OF THE INVENTION

1. Field of the Invention

The present invention relates to valves and more particularly relates to rotary valves for controlling fluid flow within pipe-lines. Even more particularly, the present invention relates to rotary type valves useful in controlling flow from pneumatic type pumping systems especially during the pumping of bulk or slurry cargoes or viscous liquids such as oils and the like.

2. General Background and Prior Art

Pneumatic pumping systems as disclosed in my prior U.S. Pat. No. 3,883,269 are useful in the transfer of heavy or bulk materials such as slurries, viscous liquids, oil, grain material and the like. The use of a pneumatic type pumping arrangement as shown in my prior U.S. patent above referenced requires valving during the purging and filling of the respective pumping tanks. Since the cargo being pumped in many cases will be of such a heavy, viscous, or slurry nature, abrasion is a problem as well as complete emptying. Abrasion due to the solid materials being pumped in slurries for example is a problem. Also, an opening and closing of the valve in rapid time sequence would be a necessity for such a valve, as would be the opening and closing with minimal friction.

In U.S. Pat. No. 881,228, there is seen a valve structure having a rotary disc valve mounted upon pressure side of a valve seat. The valve is provided with a plurality of openings and a corresponding plurality of openings are formed in the valve seat. When the openings of the valve and the seat correspond, fluid passes freely through the openings, but when the valve is turned so that its openings are blanked by the seat passage of fluid through the casing is cut off.

In U.S. Pat. No. 937,368 entitled "Water Gate", there is seen a valve structure apparently intended for use by firemen. The valve provides a tapering shell having a conically bevelled seat, a slot, and a perforated diaphragm with a rotary gate bevelled at its periphery to fit the bevelled seat of the shell. A stud extends outward through the slot and the shell and serves as a means for opening and closing the gate.

In U.S. Pat. No. 1,223,353, there is provided a hand operable valve construction having a valve seat and valve member mounted thereupon. A plurality of apertures are provided in both the seat and in the valve. The openings are similarly sized which allows fluid to flow when they align.

In U.S. Pat. No. 1,265,971 issued to G. H. Tabor there is provided a cutout valve. The valve is hand operable and provides a port plate having a number of sector shaped ports which is rotably mounted in relationship with a valve member likewise having a plurality of sector shaped ports.

U.S. Pat. No. 1,165,946 provides a valve flue which is placed between two flue-sections which are arranged in line and spaced end wise with the valve having a rotary disc valve portion arranged between the flue-sections and operatively connected with a suitably rotated shaft arranged externally of the flue.

In U.S. Pat. No. 1,344,383, a pressure regulating valve provides (see FIGS. 5 and 6) a pair of members each having perforated partitions and contacting faces of which are preferably ground to make a close smooth fit. One member is capable of rotary adjustment within a valve body. The purpose of the rotary adjustability of the one member with respect to the other is to permit variation in the position of the respective openings relative to each other. The device is according to one object of the invention a simple and efficient device for controlling the water pressure at or near the point of discharge so as not to affect the pressure on the entire line of piping or hose or at other points of discharge.

In U.S. Pat. No. 1,364,059 there is provided a valve construction which uses a casing having inlet and outlet chambers and a valve seat having at least one aperture through it and faced on the side toward the inlet chamber. A valve disc on the inlet side of the valve seat and having at least one aperture through it is provided and a valve seat protecting plate free to move against the valve disc and held from rotation therewith.

A regulator device is seen in U.S. Pat. No. 1,986,252 which provides a fixed disc having a plurality of sector ports cut through it. The disc has a central aperture which can be threaded. A disc formed with similar ports is fitted rotatably in the casing and lies against the fixed disc. The disc is connected to the fixed disc by a shouldered screw which holds the rotatable disc in place while permitting it to be turned. The movable disc has teeth at its outer periphery which are engaged by the threaded part of a worm or spindle to operate the valve. FIG. 2 best shows the valving members and the worm gear operator.

A carburetor valve in U.S. Pat. No. 2,241,537 which provides a pair of bearing members carrying a valve shaft. Fixed to the shaft is a rotatable valve member having three radial passageways which would in one position register with the radial passageways of a stationary valve member and when in another position the passageway through the valve is closed. (See FIGS. 2 and 3 of U.S. Pat. No. 2,241,537.)

U.S. Pat. No. 3,396,904 provides an adjustable air inlet closure operable by a lever L. The adjustable air inlet has a plurality of similarly apertured panels or discs which are pivotally attached for movement together between a tight fully closed position and a fully open position which provides alignment of the apertures of the rotatably adjustable discs.

While these prior art patents provide various disc constructions wherein one disc is rotatably mounted with respect to the other, none solve the problem of a valve construction which can efficiently and successfully open and close automatically to control the flow of fluids such as slurries, viscous liquids, and the like when used in conjunction with the pumping of heavy, viscous, or slurry or abrasive materials by for example pneumatic pumping.

The problems additionally of valving associated with the pressurization in pneumatic pumping is not solved by the prior art. Each pumping tank is pressurized once filled, during filling, the valve receives flow, often pressurized, from an upstream source as a pipeline. Thus, the valve is subjected to abuse from both the upstream and downstream sides and must effectively operate during the opening thereof (receiving flow through a pipeline) and the closing thereof (with immediate pressurization of an associated pumping tank pressurizing the downstream side of the valve).

General Discussion of the Present Invention

A rotary valve apparatus is provided which can easily be attached between two conventional joints of pipe in a pipeline at, for example, a flanged bolted connection. The valve body would be mounted between the flanged members and be supported between the flanged members at the bolt circle. The valve body is preferably circular conforming to the circular bore of the pipeline and is mounted between the flanges perpendicular to the pipeline bore with the valve body defining a central valve axis. A central shaft opening is provided at the center of the valve body centered on the valve axis. A pair of generally pie-shaped similarly sized and shaped flow openings are provided in the valve body at opposite radial positions with respect to one another, each being symmetrically placed about the valve axis. Each flow opening provides a pair of linear edges projecting radially between the shaft opening and the peripheral edge portion of the body but terminating short of the shaft opening and short of the peripheral edge. The edges normally fall on a line intersecting the central axis of the valve.

A valve member is provided with the valving member comprising a central hub having a shaft opening therethrough. A pair of pie-shaped valving members which are similarly shaped and correspond to the pair of flow openings are connected to the hub by welding, for example, with each of the valving members providing a circular peripheral outer edge and a pair of straight side edge portions defining radial lines intersecting the central hub and the valve axis during operation.

An operator shaft passes through the valve body and the valving member and is affixed to the valving member by welding, a keyway, a set screw or like means so that the valve member and shaft rotate together.

A preferably pneumatic operator, is provided for rotating the shaft and the attached valving body between angular positions with respect to the valve body. During operation, instrumentation air supplied to the valve body and thence to the operator causes the operator to rotate the shaft in different rotatonal directions as desired and correspondingly produces a rotation of the valve member and its two pie-shaped valving member portions. The operator thus moves the valving member pivotally a total of approximately 90 degrees in two rotational directions which alternatively opens and closes the pie-shaped flow openings of the valve body. Stops can be provided to limit the degree of rotaton of the valving member.

The pie-shaped valving member portions have a corresponding shape to the pie-shaped flow openings of the valve body. However, they are of slightly greater size so as to cover and seal the pie-shaped flow openings in a closed flow position.

During open flow, the pie-shaped valving members move away from their positions covering the pie-shaped flow openings in a position which maximizes the size of the pie-shaped flow openings for maximizing fluid flow.

Thus it is an object of the present invention to provide a valve construction which can be easily attached between successive joints in a pipe-line. It is another object of the present invention to provide a thin wafer-type valve construction for use in pipe-lines which can be readily attached at any point within the pipe-line perpendicular to the pipe-line bore.

Still another object of the present invention is to provide a rotary valve construction which is automatically operable using a remote instrumentation.

Another object of the present invention is to provide a rotary valve apparatus which is simple in construction and easy to maintain.

It is another object of the present invention to provide a rotary valve apparatus especially adapted to valve the pumping tanks in pneumatic pumping systems.

It is another object of the present invention to provide a rotary valve apparatus which minimizes friction and wear on the valve working parts.

It is another object of the present invention to provide a rotary valve apparatus which maximizes the flow opening within the particular pipe-line or pneumatic pumping system being operated.

Another object of the present invention is to provide a rotary apparatus minimizing the number of working parts.

Still another object of the present invention is to provide a rotary apparatus which can be used with abrasive or slurried materials such as coal slurries, bulk cargoes, viscous liquids, such as grain, coal, oil, and the like.

Another object of the present invention is to provide a valve which can withstand pressurization on the downstream side of the valve as occurs in the filling and emptying of pumping tanks with which the valve is used in, for example, pneumatic pumping systems.

Another object of the present invention is to provide a valve useful in the valving of solid materials which are fluidized by gas or air, as grain, for example.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIGS. 5-5A are front and side views respectively of the valve body portion of the preferred embodiment of the apparatus of the present invention;

FIGS. 6-6A are front and side views respectively of the valving member portion of the preferred embodiment of the apparatus of the present invention; and FIGS. 7-7A are front and side views respectively of the seal ring portion of the preferred embodiment of the apparatus of the present invention.

DETAILED DESCRIPTION OF THE PREFERRED EMBODIMENT

Figure 1:
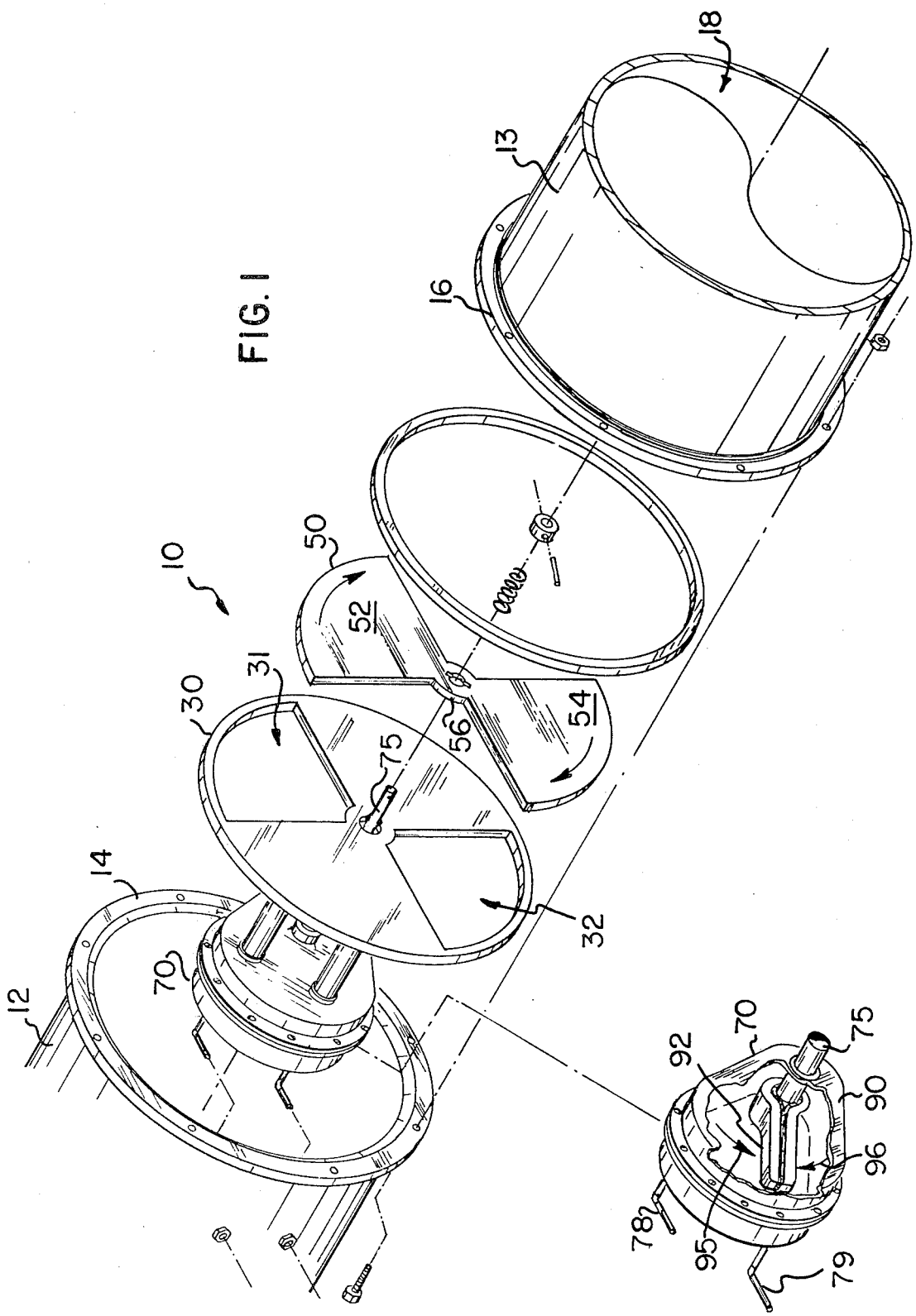
FIG. 1 is a perspective partially cut away view of the preferred embodiment of the apparatus of the present invention.

FIGS. 1 and 2-4 illustrate best the preferred embodiment of the apparatus of the present invention. Valve 10 comprises generally a valve body 30 having a pair of pie-shaped flow openings 31, 32 therethrough for allowing flow through valve body. Valve body 30 would be mounted between a pair of pipeline joints 12, 13, for example, between flanges 14, 16 within the bore 18 portion of the pipeline.

A valving member 50 is rotatably mounted upon valve body 30 with valving member 50 having a pair of pie-shaped valve plates 52, 54 being provided as part thereof and attached at their inner portions to hub 56.

An operator 70 providing on operator shaft 75 is attached to the downstream surface of body 30 with shaft 75 penetrating the central opening 38 of body 30 and attaching at hub 56 to valving member 52. During operation, shaft 75 will rotate valving member 50 as will be described more fully hereinafter between open flow and closed flow positions.

The particular construction of valve body 30 is seen, for example, in FIGS. 5 and 5A. Valve body 30 is preferably circular in shape conforming with the circular cross section of pipeline inner bore 18. A pair of flow openings 31, 32 are provided in valve body 30 extending from a position near central opening 38 (which allows passage of shaft 75 therethrough) a distance toward the outer peripheral edge 35 portion of body 30 but terminating a distance D from peripheral edge 35, thus retaining the structural integrity of body 30.

A pair of instrumentation air supply lines 40, 41 are provided which would allow the introduction of instrumentation air through lines 40, 41 to ports 42, 43 respectively. As will be discussed more fully hereinafter, operator 70 would be mounted on the downstream face portion of body 30 (see FIG. 2) and would attach near instrumentation ports 42, 43 allowing the introduction of instrumentation air or like operating media to enter operator 70 through lines 78, 79 and rotate shaft 75.

Figure 3:
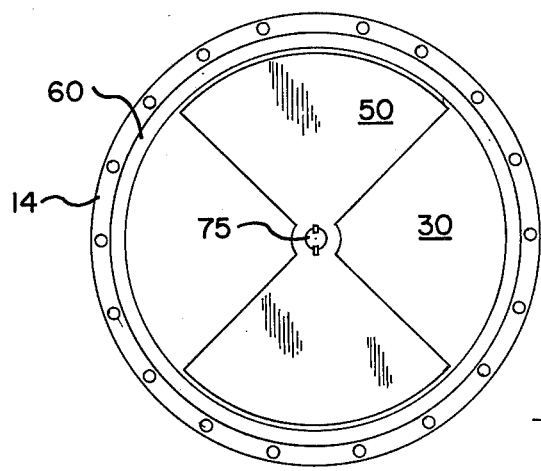
FIG. 3 is a sectional view taken along lines 3—3 of FIG. 2.
Figure 4:
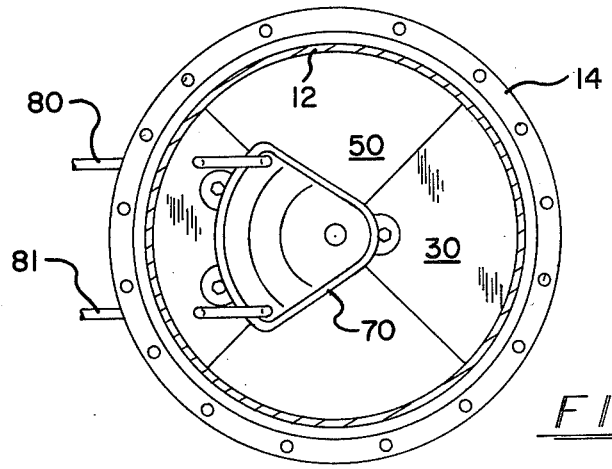
FIG. 4 is a sectional view taken along line 4—4 of FIG. 2.

FIGS. 6-6A show more particularly the construction of valving member 50. Valving member 50 provides a pair of pie-shaped valve plates 52, 54 which are attached at their innermost portion at hub 56. A hub opening 58 allows the passage of shaft 75 therethrough. Alternatively, keyways as shown in FIG. 3 could be used to effect a firm connection of valving member 50 to shaft 75 so that valving member will rotate with shaft 75 during operation.

Operator 70 is a conventional pneumatic type valve actuator. A suitable operator 70 would be, for example, a vane type actuator as manufactured by Matryx Company. Such an operator has an outer housing 90 of, for exammple, cast aluminum, with a vane 92 attached to shaft 75. Vane O-ring 94 forms a seal with housing 90. Instrumentation air supplied through line 78 will rotate vane 92 and shaft 75 in the direction of arrow 95. Air supplied through line 79 will rotate vane 92 and shaft 75 in the direction of arrow 96.

Operator 70 would be mounted using support brackets 72-74. Brackets 72-74 would be attached to the face portion of body 30 by welding, or by screwed connection (FIG. 2) or the like. It should be understood, however, that such attachment should not interfere with the free rotation of valving member 50 on the upstream face of body 30 as will be described more fully.

Figure 2:
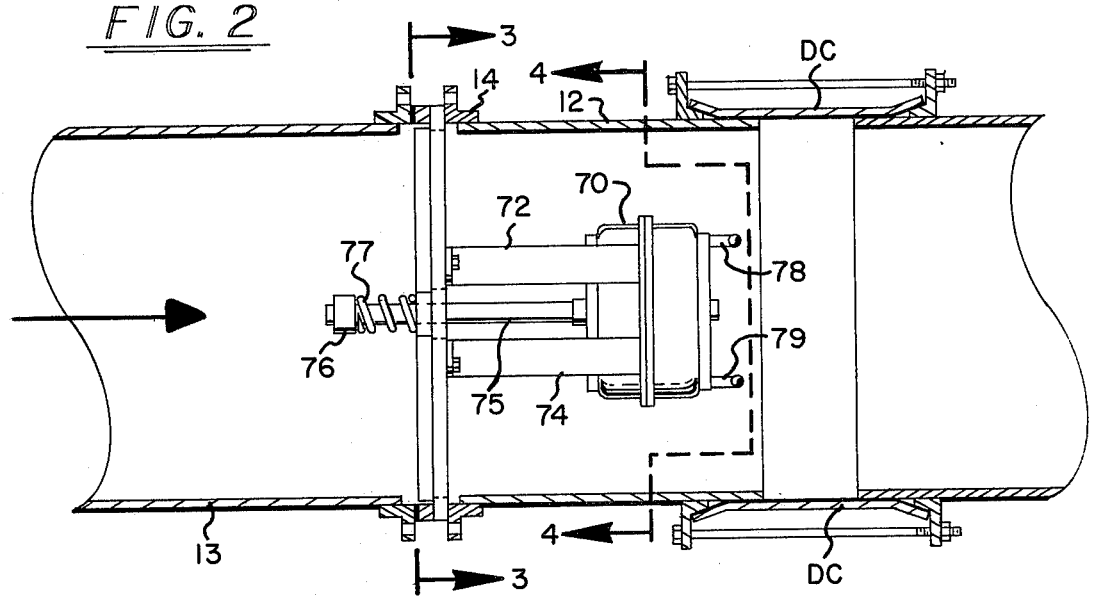
FIG. 2 is a sectional side view of the preferred embodiment of the apparatus of the present invention placed in its operating position within a pipeline.

Hub 76 as seen best in FIG. 2 would be integrally attached using keyways, for example, to shaft 75 with spring 77 occupying a position between hub 76 and valving member 50. Spring 75 would bias valving member 50 against valve body 30 to insure a tight sealed enclosure.

Dresser coupling DC could be connected to pipeline joint 12, allowing easy access to valve 10.

Instrumentation air supply lines 78, 79 would convey instrumentation air or the like from ports 42, 43 to operator 70. Lines 80, 81 would convey such instrumentation air to instrumentation air supply lines 40, 41 of body 30.

Valve 10 would be preferably of a suitable structural material such as steel, cast iron or the like and could be of welded or bolted construction.

FIG. 7-7A illustrate the seal ring 60 portion of valve 10 which is generally circular and provides a central opening 62. Ring 60 would occupy a position between flanges 14 and 16 and, more particularly, between flange 14 and body 30 as best seen in FIG. 2. In the preferred embodiment, ring 60 and valve body 30 would be placed inside the normal bolt circle of flanges 14, 16 with the assembly bolts (not shown) passing thereover.

This arrangement is seen in FIG. 2.

Operation of valve 10 would be by conventional instrumentation air or the like. Air would be added through lines 80-81 to effect a closure or opening of valving member 50 on body 30. A closed position would be achieved when pie-shaped plate 52 covered opening 31. As will be understood by one skilled in the art, the construction of valving member 50 is such that simultaneous with the covering of opening 31 with plate 52, a covering of plate 32 would be effected by plate 54.

Openings 31, 32 provide radial projecting edges designated respectively by the numbers 33, 34 and 36, 37. These radial edges would be approximately 90 degrees with respect to one another. The radial sides 53, 55 of plate 52 and 59, 61 of plate 54 would be spaced sufficiently so as to effect the coverage of openings 31, 32 in a closed flow position and yet occupy the unopened portion of body 30 when valve 10 was in an open flow position. Thus for example, valve plate 52 would occupy a position in between edge 33 and 37 while simultaneously plate 54 would occupy a position between edge 34 and 36 during the open flow position. In this manner, applicant has found that an approximate 48 percent opening of bore 18 can be achieved with the entire valve apparatus being fully self-contained in the valve bore itself, with no operator portions extending beyond the valve bore. If desired, stops (not shown) of metal or rubber or a combination could be welded or otherwise connected to ring 60 to fix the degree of rotation of valve member 50 in each rotational direction.

In the preferred embodiment, pipeline joint 12 represents the upstream joints while pipeline joint 13 represents the downstream joint. Thus, during normal flow into, for example, a pumping tank of a pneumatic pumping system, flow will be from joint 12 to joint 13. In fact, joint 13 could, in fact, be the end portion of a pumping tank used with a pneumatic pumping system. As flow was incoming, from joint 12 to joint 13 (or a pumping tank attached directed to the downstream side of the valve), the pressure acting on the valve would change from one side to the other. During normal flow, into the valve from joint 12, pressure would be primarily applied on the upstream side. However, spring 77 would urge valving member 50 into close face-to-face engagement with valve body 30. When a pumping tank would be placed at the position roughly shown by joint 13 in FIGS. 1 and 2, the pumping tank once filled would through provided instrumentation cause valve member 50 to shut. Thereafter, the pumping tank would be pressurized now exerting pressure on the downstream side of valve body 30. This is why in the preferred embodiment, valving member 50 would be provided on the downstream side as the pressure normally within a pumping tank of a pneumatic pumping system which would be the same position as shown by joint 13. The pressurizing of the pumping tank would urge valving member 50 into a close sealing engagement with housing 30 and would prevent any leakage during this pressurization of the pumping tank. Thus, the valve of the present invention lends itself readily to use the pneumatic systems, in fact, attached directly to a pumping tank portion of a pneumatic pumping system, able to withstand the repeated pressurization of the tank during the emptying thereof.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A rotary valve apparatus comprising:
   a. a generally flat circular disc valve body providing an open center defining a valve central axis;
   b. a plurality of radially spaced flow openings formed in said circular valve body, each of said openings being generally pie-shaped and comprising:
      i. inner and outer curved portions being concentric with one another and being adjacent respectively to said axis and the peripheral outer edge portion of said body;
      ii. a pair of radial opening edge portions connecting respectively between said inner and said outer curved portions of said opening;
   c. a generally flat valving member mounted against said valve disc body, said valving member comprising:
      i. a central hub having a shaft opening therethrough which axially aligns with said valve body open center;
      ii. a plurality of valving members connected to said hub corresponding to said plurality of flow openings, each of said valving members having a corresponding size and shape to each of said flow openings of said valve body said valving members forming a closure with said flow openings when said valving members are superimposed on said flow openings;
   d. a common operator shaft disposed entirely within the fluid flow being valved and passing through the central portion of said open center of said valve body and said valving member, and being affixed for rotation with said valving member at said shaft opening; and
   e. a pneumatically operative operator means connected to said valve body and having attachment to said common shaft for imparting rotation thereto.

2. The rotary valve apparatus of claim 1 wherein said circular valve body central axis defines a center of rotation for said common shaft.

3. The rotary valve apparatus of claim 1 wherein said operator means is a vane actuator.

4. The rotary valve apparatus of claim 1 wherein there is further provided at least one conduit bored laterally into said circular valve body and outcropping on one side thereof adjacent said operator means, for providing instrumentation air to said operator means.

5. The rotary valve apparatus of claim 1 wherein there is further provided biasing means for urging said valving member and said valve body together in a face to face engagement.

6. The rotary valve apparatus of claim 1 wherein said valving member is affixed for rotation with said operator shaft by a key way provided on said operator shaft and a corresponding recess formed in said central hub.

7. The rotary valve apparatus of claim 1 wherein there is further provided bracket means for affixing said operator means to one side of said valve body.

8. A rotary disc valve apparatus for placement between pipeline flanges comprising:
   a. a first pipeline joint having an attached flange connection member;
   b. a second pipeline joint having an attached flange connection member, said first and second joints defining a pipeline bore carrying a fluid flow;
   c. a generally flat circular disc valve body mounted between said flanges generally perpendicular to said pipeline bore and having a center defining a valve central axis and having a central shaft opening centered on said axis, and a plurality of generally pie-shaped flow openings, said flow openings being at equi-radial positions with respect to one another, each being symmetrically placed about said axis, each of said flow openings providing linear edges projecting radially between said shaft opening and the peripheral edge of said body but terminating short of said shaft opening and said peripheral edge;
   d. a generally flat valving member mounted against said valve body in face-to-face engagement therewith, said valving member comprising:
      i. a central hub having a shaft opening therethrough;
      ii. a pair of pie-shaped valving members, connected to said hub, each of said valving members having a circular peripheral outer edge and a pair of straight side edge portions defining radial lines from the central hub of said valving member to said peripheral edge portion;
   e. a common operator shaft passing through said valve body shaft opening and said valving member hub shaft opening and being keyed to said valving member for rotation therewith, said valve body, said common shaft and said valving member all defining a common central axis coincident with said central pipeline bore axis with said common shaft entirely disposed within said pipeline bore; and
   f. pneumatically operative operator means connected at least in part to said shaft and positioned within the fluid flow stream being valved, and anchored to said body for rotating said shaft and said valving member between desired angular positions.

9. The rotary disc valve apparatus of claim 8 wherein said operator means is a vane actuator.

10. A rotary valve apparatus comprising:
    a. a normally fixed generally flat circular disc defining a valve body providing a plurality of radially spaced flow openings and an open center;
    b. a generally flat valving member mounted in face-to-face engagement with said disc and movable with respect thereto between open and closed positions, said valving member comprising a hub with a shaft opening therethrough and a plurality of radially projecting valving members which align with and cover said flow openings in said closed position;

c. a common shaft penetrating said open center and said shaft opening, affixing at one end to said valving member for rotation therewith, said common shaft being generally coincident with the central axis of said valve body and being entirely disposed within the fluid flow stream being valved;

d. a pneumatically operative vane affixed to said common shaft at the opposite end portion thereof from said valving member, said vane moving with said shaft through equi-angular rotation;

e. a vane housing mounted on said circular disc and about said vane, said housing providing stops defining the extent of angular movement of said vane, said shaft, and said valving member, and movement of said vane between said stops correspondingly moving said valving member between said open and closed positions.

11. A rotary valving apparatus comprising:

a. pipeline means providing a generally cylindrical bore defining at its center a bore central axis for conveying a fluid;

b. a flat circular valve body disposed transversely within said bore generally perpendicular to said bore central axis, and providing a shaft opening coaxial with said bore axis;

c. at least one flow opening in said valve body radially offset from said bore axis;

d. a common operator shaft disposed within said bore generally coincident with said bore axis and passing at one end through said shaft opening;

e. a flat valving member affixed to said shaft for rotation therewith and in face-to-face engagement with said valve body and providing a closure for said flow opening;

f. a pneumatic actuator disposed within said cylindrical bore, said actuator having a vane affixed to said shaft for movement therewith and a housing positioned about said vane; and g. means for supporting said housing within said bore while allowing said shaft and vane to move with respect thereto.

* * * * *